United States Patent
Song

(10) Patent No.: US 9,851,622 B2
(45) Date of Patent: Dec. 26, 2017

(54) MOUNTING STRUCTURE FOR A CAMERA SYSTEM

(71) Applicant: Xiaoyi Technology Co., Ltd., Shanghai (CN)

(72) Inventor: Ye Song, Shanghai (CN)

(73) Assignee: XIAOYI TECHNOLOGY CO., LTD., Shanghai (CN)

( * ) Notice: Subject to any disclaimer, the term of this patent is extended or adjusted under 35 U.S.C. 154(b) by 14 days.

(21) Appl. No.: 15/135,035

(22) Filed: Apr. 21, 2016

(65) Prior Publication Data
US 2017/0255082 A1    Sep. 7, 2017

(30) Foreign Application Priority Data
Mar. 2, 2016   (CN) .......................... 2016 1 0118394

(51) Int. Cl.
| | |
|---|---|
| *G03B 17/56* | (2006.01) |
| *F16M 13/04* | (2006.01) |
| *A45F 5/00* | (2006.01) |
| *A45F 5/02* | (2006.01) |
| *F16C 11/10* | (2006.01) |

(52) U.S. Cl.
CPC .............. *G03B 17/561* (2013.01); *A45F 5/02* (2013.01); *F16C 11/103* (2013.01); *F16M 13/04* (2013.01); *A45F 2005/008* (2013.01); *A45F 2005/025* (2013.01)

(58) Field of Classification Search
CPC ......... G03B 17/561; A45C 11/38; A45F 5/00; A45F 2005/008; A45F 2005/22; A45F 2005/0533; F16M 13/04
USPC .......................................... 396/420; 224/261
See application file for complete search history.

(56) References Cited

U.S. PATENT DOCUMENTS

| | | | |
|---|---|---|---|
| 2013/0251330 A1* | 9/2013 | Willenborg ............ | H04N 5/765 386/224 |
| 2016/0131963 A1* | 5/2016 | Clearman ............ | G03B 17/561 224/267 |

OTHER PUBLICATIONS https://web.archive.org/web/20150709 01420/htttps://shop.gopro.com/mounts/the-strap-hand-plus-wrist-plus-arm-plus-leg-mount/AHWBM-001.html, Jul. 9, 2015, 3 pages, GoPro, U.S.A.
https://web.archive.org/web/20150705204430/http://www.rearviz.com/product/sports-unimount-ut-35/, Jul. 5, 2015, 3 pages, RearViz, Australia.

* cited by examiner

*Primary Examiner* — Rochelle-Ann J Blackman
(74) *Attorney, Agent, or Firm* — Finnegan, Henderson, Farabow, Garrett & Dunner, L.L.P.

(57) ABSTRACT

A mounting structure for a camera system includes a wearable portion; a base portion attached to the wearable portion; a mount portion; and a first fastener attaching the mount portion to the base portion, wherein a frictional force between the base portion and the mount portion controls a rotation of the mount portion about an axis of the first fastener. The mounting structure further includes a second fastener attaching a camera to the mount portion.

4 Claims, 5 Drawing Sheets

MOUNTING STRUCTURE FOR A CAMERA SYSTEM

CROSS-REFERENCE TO RELATED APPLICATION

This application is based upon and claims the benefit of priority from Chinese Patent Application No. 201610118394.X, filed on Mar. 2, 2016, the disclosure of which is expressly incorporated herein by reference to its entirety.

TECHNICAL FIELD

The present disclosure generally relates to camera systems and, more particularly, to mounting structures for cameras.

BACKGROUND

With cameras becoming smaller and more portable, cameras are being used more often and under more diverse circumstances. Various models of cameras are available with functions suitable to the needs of different consumer groups. For example, action cameras, sometimes called sport cameras, may be used to record high-speed actions.

Traditionally, to capture an image or video, the user needs to hold the body of the camera while operating the camera's functions, e.g., via buttons. While the camera functions are advancing and allowing users to take better images or videos, however, the need to hold the camera constrains the user's ability to participate in other activities while attempting to record events in action. The first challenge is to maintain the stability of the camera to optimize the clarity of the images or videos. The second challenge is to allow the user to operate the camera while concentrating on the ongoing activity.

When a user is engaged in an activity, such as a sporting or recreational event, for example, it is difficult to operate the camera simultaneously. Furthermore, the user may be required to operate the camera under adverse conditions, such as underwater or at high altitude, where the user is preoccupied with the activity itself and external factors (such as water current or wind condition) require the camera to be secured to the user. The need to hold the camera becomes unnecessarily burdensome, which could potentially jeopardize the safety of the user, and maintaining its stability during use becomes challenging.

Moreover, an action camera may often be used to capture a wide angle of view, such as in a panoramic shot. Prior art devices used to mount or secure a camera to the user are either complicated or cumbersome to attach, or they provide limited flexibility in terms of the ease of adjusting the angle or rotation of the camera. Therefore, a user's experience or preference with a camera may be reduced due to these difficulties or inconveniences.

SUMMARY

Consistent with embodiments of the present disclosure, there is provided a mounting structure for a camera system, which comprises a wearable portion, a base portion attached to the wearable portion, a mount portion, and a first fastener attaching the mount portion to the base portion, wherein a frictional force between the base portion and the mount portion controls a rotation of the mount portion about an axis of the first fastener.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
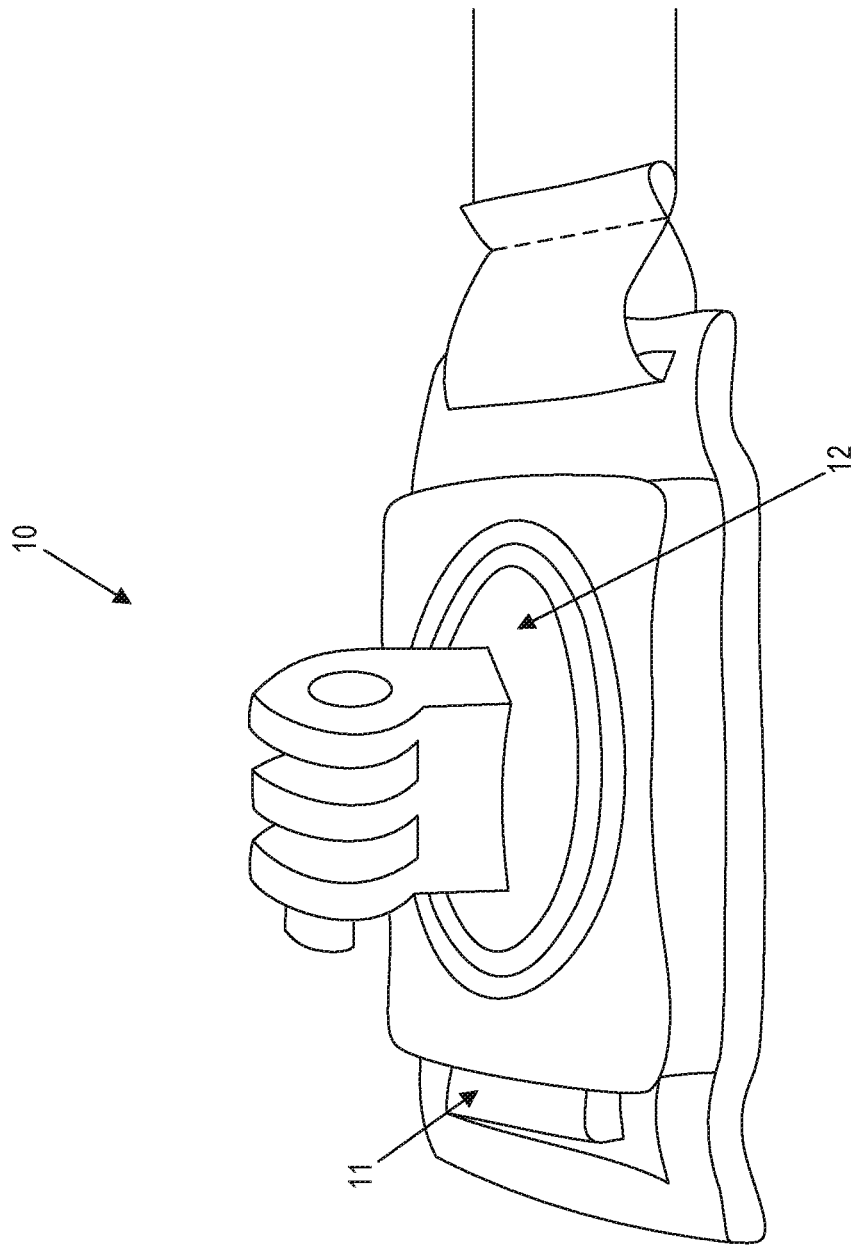
FIG. 1 illustrates a mounting structure used in existing technology.

The following detailed description refers to the accompanying drawings. While several illustrative embodiments are described herein, modifications, adaptations and other implementations are possible. For example, substitutions, additions or modifications may be made to the components illustrated in the drawings. Accordingly, the following detailed description is not limited to the disclosed embodiments and examples. Instead, the proper scope is defined by the appended claims.

Consistent with the disclosure herein, there is provided a mounting structure for a camera system which permits the user to stabilize the camera and select from a wide range of camera rotations. As described in further detail below, the mounting structure disclosed herein may include a wearable portion permitting user to removably attach the camera to the user's body, clothes, and/or gear (e.g., a wristband or a helmet); a base portion attached to the wearable portion (e.g., through adhesives or other chemical or mechanical mechanisms); a mount portion; and a first fastener attaching the mount portion to the base portion, wherein a frictional force between the base portion and the mount portion controls a rotation of the mount portion about an axis of the first fastener.

The base portion may be removably attached to the mount portion by the first fastener. The contacting surfaces of the base portion and mount portion may generate friction such that unintentional movement of the camera can be restricted while enabling the user to freely rotate the camera. For example, the contacting surface of the base portion may be made with the same or different materials from the contacting surface of the mount portion. The materials may be made of one or more of various types of materials, such as metal, plastic, polyester, or other synthetic or natural material exhibiting frictional properties. In addition, the corresponding surfaces of the base and mount portions may be shaped so as to modify the frictional properties of the materials, e.g., by roughening or smoothing the materials. In this manner, the frictional force may be adjusted so as to be sufficient to prevent unintentional movement of the camera when not in use while allowing the user to easily overcome that force when turning the camera by hand.

The mount portion may be of different shapes or sizes. The mount portion may include, for example, protrusions in the form of one or more disks of different shapes or sizes with center holes. For example, the protrusions may be in the shape of square, circular, or triangular disks. In one aspect, the mount portion stabilizes the camera in a fixed position that allows the camera to rotate along with the mount portion about an axis of the first fastener. Alternatively, the mount portion permits the camera to also rotate about an axis of a second fastener, in a plane perpendicular to the base portion. The external rims of the protrusions of the mount portion may further include grooves, gear teeth, or other configurations such that unintentional movement of the camera can be restricted while enabling the user to freely adjust the angle of the camera.

The mounting structure disclosed herein may be used in combination with a camera or a separate camera accessory such as a casing. For example, the mounting structure may be attached to a camera with protrusions configured to removably attach to the mount portion. The camera protrusions may be in the form of one or more disks of different shapes or sizes with center holes, which correspond to protrusions of the mount portion. Alternatively, the casing with which the mounting structure is attached may be a cover that is separate from the camera, but which can be readily installed on the camera, such as a waterproof protective case that may be separately purchased and installed by a user. The casing may include protrusions in the form of one or more disks of different shapes or sizes with center holes, which correspond to the protrusions of the mount portion.

FIG. 1 shows a camera mounting structure 10 used in existing technology. More particularly, the camera mounting structure 10 includes a release button 11 that locks the base portion 12 in place relative to the camera (not shown). The user must press and hold the release button 11 to permit the rotation of the base portion 12 relative to the camera (not shown).

Figure 2:
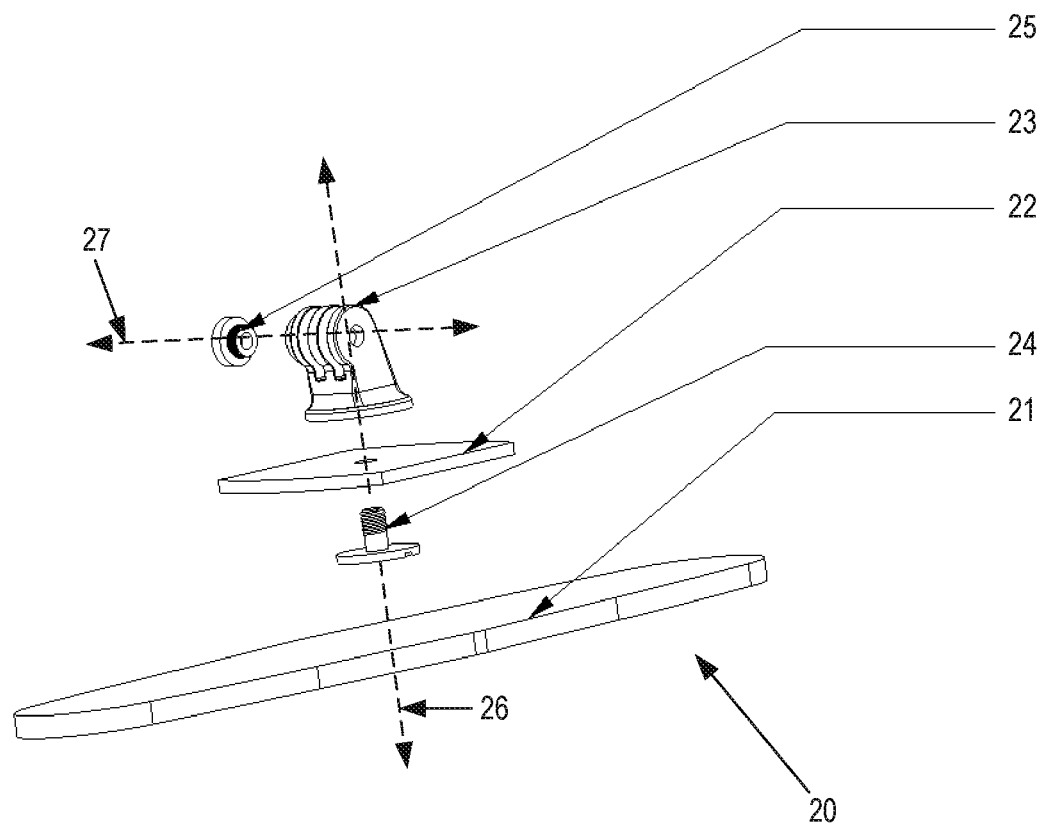
FIG. 2 illustrates an exploded view of an exemplary embodiment of the mounting structure, consistent with the present disclosure.

FIG. 2 provides an exploded view of an exemplary embodiment of a mounting structure 20 consistent with the present disclosure. The mounting structure 20 includes a wearable portion 21, a base portion 22, a mount portion 23, a first fastener 24, and a second fastener 25. The wearable portion 21 permits a user to removably attach the camera to the user's body, clothes, and/or gear. The wearable portion 21 may be in various forms and shapes to suit the overall need of the user. For example, the wearable portion may include (but is not limited to) a wristband, a helmet, or footwear.

The base portion 22 may be attached to the wearable portion 21 through, e.g., adhesives or other chemical or mechanical mechanisms. The base portion 22 may be in various forms and shapes (e.g., square, circular, or triangular), to suit the overall design of the mounting structure 20. The base portion 22 may be made of one or more of various types of materials, such as metal, plastic, polyester, or other synthetic or natural material exhibiting frictional properties. Alternatively, the base portion may be provided with a frictional layer.

The mount portion 23 may permit the camera (not shown) to be removably attached to the mounting structure 20. The mount portion 23 may be of different shapes or sizes. The mount portion 23 may include, for example, protrusions in the form of one or more parallel disks of different shapes or sizes with aligned center holes. The mount portion 23 may be made of one or more of various types of materials, such as metal, plastic, polyester, or other synthetic or natural material exhibiting frictional properties. Alternatively, the mount portion may be provided with a frictional layer.

The first fastener 24 may attach the mount portion 23 to the base portion 22, so that a frictional force between the base portion 22 and the mount portion 23 controls a rotation of the mount portion 23 about an axis 26 of the first fastener. When the camera is attached to the mount portion 23, the frictional force indirectly controls the rotation of the camera. The first fastener 24 may be attached to the wearable portion 21, for example, through adhesives or other chemical or mechanical mechanisms.

A second fastener 25 may attach the camera to the mount portion 23. The first fastener 24 and the second fastener 25 may be of different shapes or sizes. For example, the fasteners may be screws or pins. The fasteners may be made of one or more of various types of materials, such as metal, plastic, polyester, or other synthetic or natural material suitable for holding the other portions of the mounting structure together.

Figure 3B:
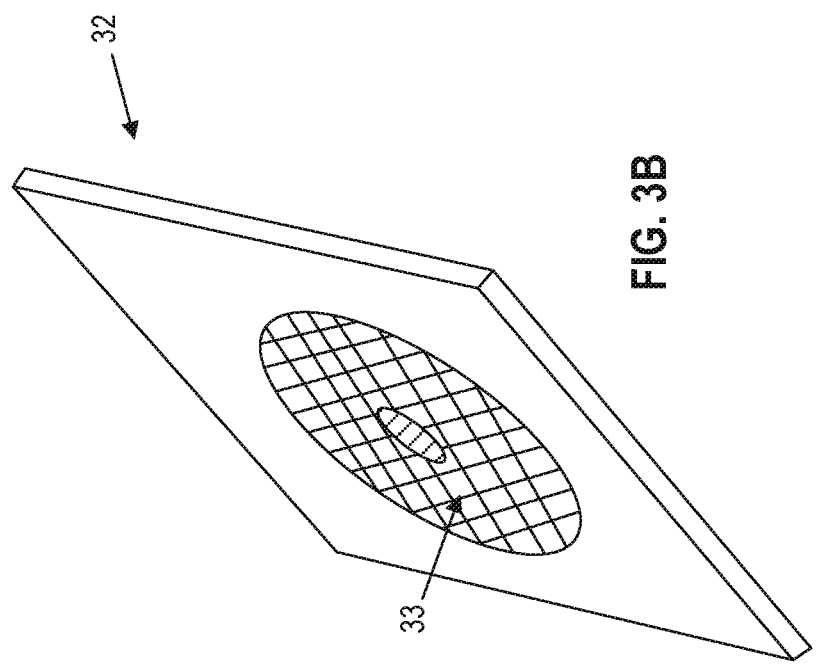
FIGS. 3A-3B illustrate exemplary embodiments of the mounting structure indicating the friction-generating surfaces of the base portion and the mount portion.
Figure 3A:
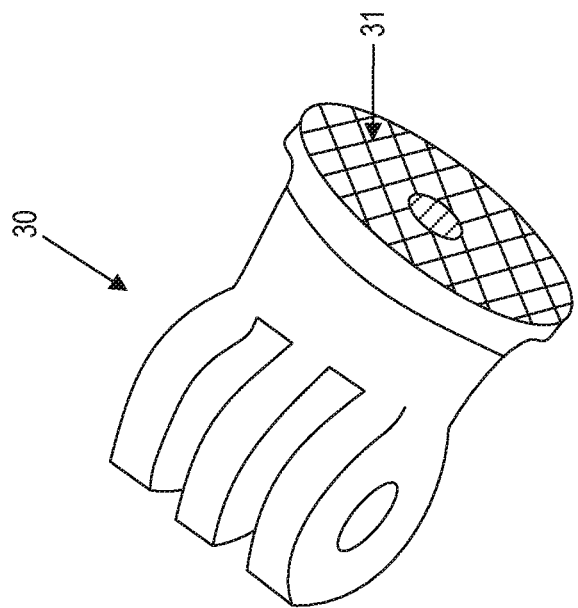

FIGS. 3A-3B illustrate exemplary embodiments of the mounting structure 30 indicating the friction-generating surfaces of the base portion 32 and the mounting portion 30. In the illustrated embodiment, base portion 32 includes a surface 33 in contact with a surface 31 of the mount portion 30. The contacting surfaces 31 and 33 generate friction such that unintentional movement of the camera can be restricted while enabling the user to freely rotate the camera by hand. Together the surfaces 31 and 33 form the friction-generating surfaces.

As for the materials of the friction-generating surfaces, the surface 33 of the base portion 32 may be made with the same or different materials from the surface 31 of the mount portion 30. The materials may be of various types, such as metal, plastic, polyester, or other synthetic or natural material exhibiting frictional properties. In addition, the surfaces 31 and 33 may be shaped so as to modify the frictional properties of the materials, e.g., by roughening or smoothing the materials. In this manner, the frictional force may be adjusted so as to prevent unintentional movement of the camera when not in use while allowing the user to easily overcome that force when turning the camera by hand. The choice of materials may be dictated by the level of desired stability or ease of rotation of the camera. For example, if more stability is preferred, high-friction materials may be used. On the other hand, if ease of rotating the camera is preferred, low-friction materials may be used.

The size of the friction-generating surfaces may correspond to the size of the contacting surface 31 of the mount portion 30. Alternatively, the size may be dictated by the level of desired stability or ease of rotation of the camera. For example, if more stability is preferred, the size of the friction-generating surfaces may be increased to provide more resistance from unintentional movement of the camera. On the other hand, if ease of rotating the camera is preferred, the size of the friction-generating surfaces may be reduced to provide less resistance when rotating the camera.

Other means of creating frictional resistance through physical, mechanical, or chemical mechanisms can supplement the friction-generating surfaces to achieve the desired stability or ease of rotation of the camera.

Figure 4B:
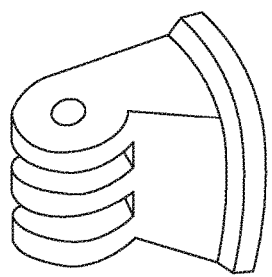
FIGS. 4A-4D illustrate exemplary embodiments of the mount portion of the mounting structure.
Figure 4D:
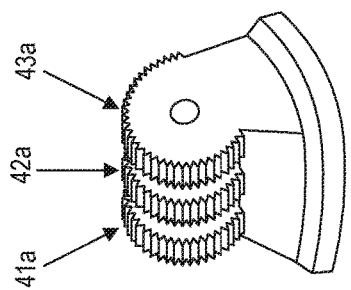
Figure 4A:
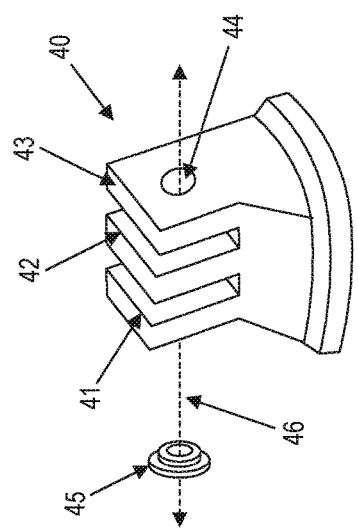
Figure 4C:
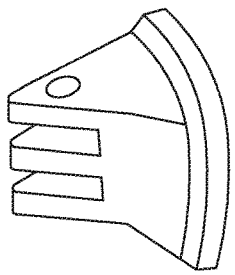

FIGS. 4A-4D illustrate exemplary embodiments of the mounting structure 40 indicating the mount portion 40. The mount portion 40 may be of different shapes or sizes. The mount portion 40 may include, for example, protrusions 41, 42, and 43 in the form of one or more disks of different shapes or sizes with center holes, such as hole 44. For example, the protrusions 41, 42, and 43 may be in the shape of square, circular, or triangular disks as illustrated in FIGS. 4A-4C, respectively. The corresponding camera or camera casing protrusions (not shown) may be in the form of one or more protrusions of different shapes or sizes with aligned center holes, which correspond to the protrusions 41, 42, and 43 of the mount portion 40. In one aspect, the mount portion 40 stabilizes the camera (not shown) in a fixed position that allows the camera to rotate along with the mount portion 40 about the axis 26 of the first fastener 24. Alternatively, the mount portion 40 may permits the camera to also rotate along an axis 46 of a second fastener 45, in a plane perpendicular to the base portion (not shown). For another example, as shown in FIG. 4D, the external rims of the protrusions 41*a*, 42*a*, and 43*a* may further include grooves, gear teeth, or other configurations such that unintentional movement of the camera can be restricted while enabling the user to freely adjust the angle of the camera by hand.

Figure 5:
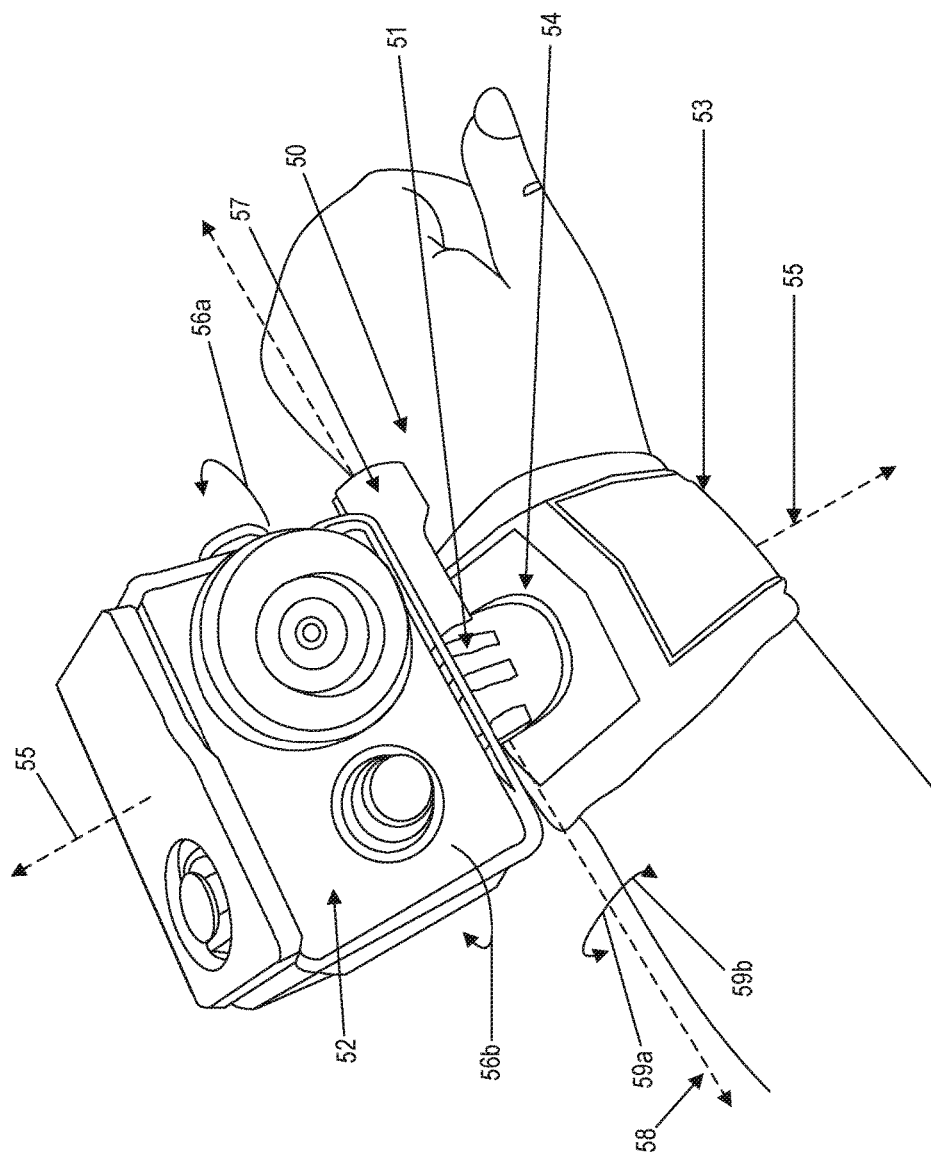
FIG. 5 illustrates an exemplary embodiment of the mounting structure with a camera removably attached to the mount portion.

FIG. 5 illustrates an exemplary embodiment of the mounting structure 50 with a camera 52 removably attached to the mount portion 51. The mounting structure 50 may include a wearable portion 53 permitting user to removably attach the camera 52 to the user; a base portion 54 attached to the wearable portion 53; a mount portion 51; and a first fastener (not shown) removably attaching the mount portion 51 to the base portion 54. In one aspect, a frictional force between the base portion 54 and the mount portion 51 controls the rotation of the mount portion 51 about an axis 55 of the first fastener. For example, the range of camera rotation about the axis 55 can be 360 degrees in either direction as indicated by arrows 56*a* and 56*b*.

In the illustrated embodiment, the mounting structure 50 further includes a second fastener 57 removably attaching the camera 52 to the mount portion 51. The camera 52 can be removed from the mount portion 51 by extracting the second fastener 57. In another aspect, the mount portion 51 permits the camera 52 to rotate along an axis 58 of the second fastener 57, in a plane perpendicular to the base portion 54. For example, the range of camera rotation about the axis 58 can be up to 180 degrees in either direction as indicated by arrows 59*a* and 59*b*.

What is claimed is:

1. A mounting structure for a camera system, comprising:
   a wearable portion;
   a base portion attached to the wearable portion and having a first friction-generating surface made of a first material;
   a mount portion having a second friction-generating surface made of a second material that is the same as or different than the first material;
   a first fastener attaching the mount portion to the base portion with the first surface in contact with the second surface, wherein a frictional force between the base portion and the mount portion is determined by frictional properties of the first and second materials and controls a rotation of the mount portion about an axis of the first fastener; and
   a second fastener for attaching a camera to the mount portion, wherein the mount portion permits a rotation of the camera about an axis of the second fastener to freely adjust the camera.

2. The mounting structure of claim 1, wherein the mount portion permits a rotation of the camera about the axis of the first fastener.

3. The mounting structure of claim 1, wherein the wearable portion is a wristband.

4. The mounting structure of claim 1, wherein the wearable portion is a helmet.

\* \* \* \* \*